Feb. 12, 1924.
R. R. BLOSS ET AL
DERRICK FITTING
Filed Dec. 24, 1920
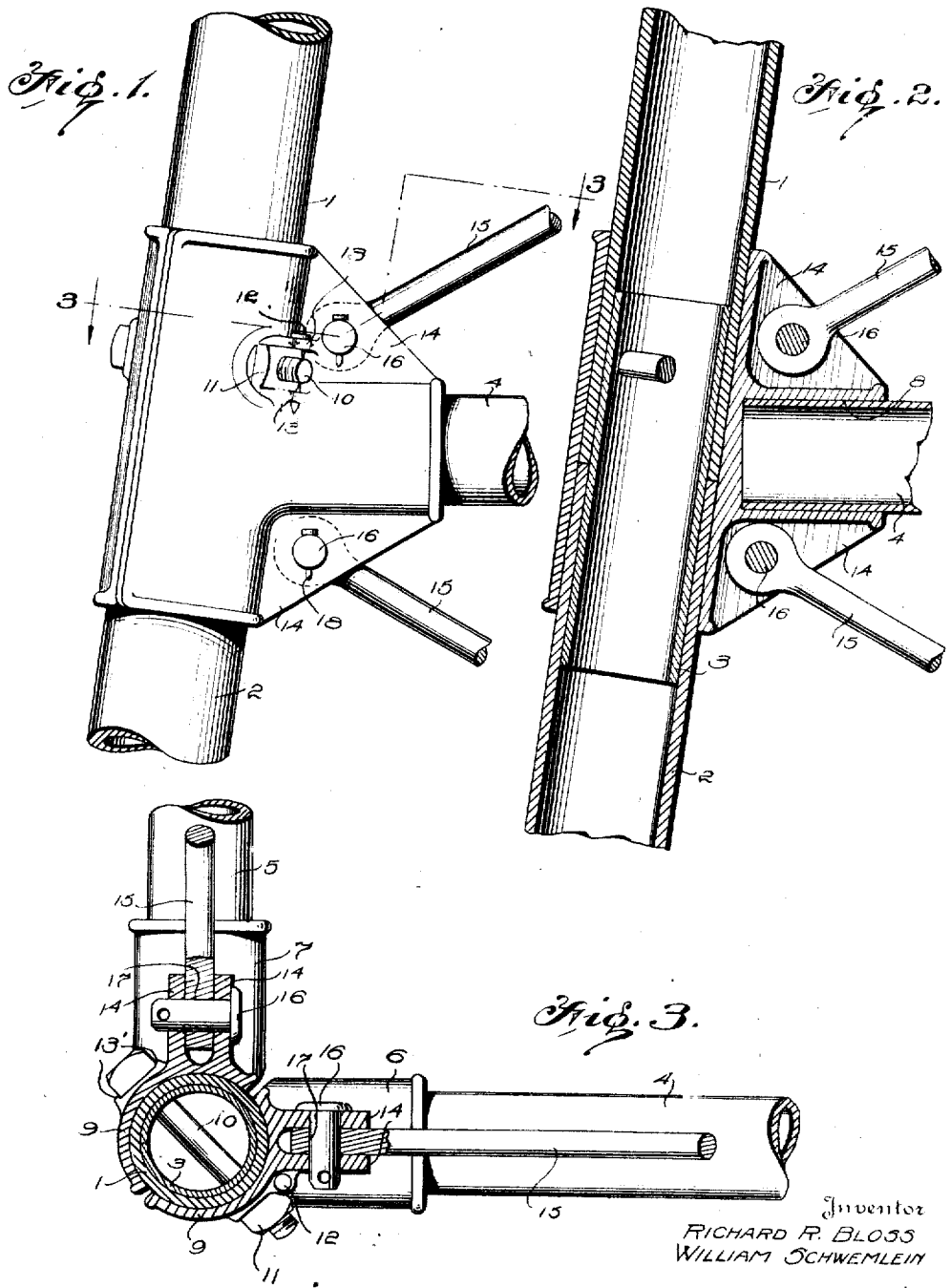

Patented Feb. 12, 1924.

1,483,602

UNITED STATES PATENT OFFICE.

RICHARD RALPH BLOSS AND WILLIAM SCHWEMLEIN, OF PARKERSBURG, WEST VIRGINIA, ASSIGNORS TO THE PARKERSBURG RIG & REEL COMPANY, OF PARKERSBURG, WEST VIRGINIA, A CORPORATION OF WEST VIRGINIA.

DERRICK FITTING.

Application filed December 24, 1920. Serial No. 432,916.

*To all whom it may concern:*

Be it known that we, RICHARD R. BLOSS and WILLIAM SCHWEMLEIN, citizens of the United States, residing at Parkersburg, in the county of Wood and State of West Virginia, have invented certain new and useful Improvements in Derrick Fittings, of which the following is a specification.

This invention relates to derrick fittings, and it comprises a member made in two sections and adapted to be secured around the abutting ends of adjacent leg sections, said members being secured to the horizontal girths forming a part of the derrick and embracing said leg sections, when in position, and diagonal bracing members adapted to be secured to said members.

In the present invention, we have produced a derrick fitting by means of which a derrick may be speedily erected and disassembled. Bolts may be employed to secure the leg sections in the members forming the fitting, but the other parts are held in position by pins or other suitable fastening means which may be quickly removed. The two members forming a fitting are permanently secured to the horizontal girths, thereby eliminating one of the usual fastening members that has to be removed in disassembling a derrick.

The fixed ends of the horizontal girths provide diagonal bracing in the horizontal plane at the different leg sections. The fittings being permanently secured to the horizontal girths, it is possible to develop the full strength of the girth as a beam. When resisting compression strains, the horizontal girth acts as a column with fixed ends. When resisting the tendency of the derrick to be distorted from a true rectangular shape, the girth acts as a beam fixed at both ends.

In the accompanying drawings, we have shown one embodiment of the invention. In this showing:

Figure 1 is a side elevation of a portion of a derrick showing the fitting applied, Figure 2 is a vertical sectional view, and, Figure 3 is a horizontal sectional view on line 3—3 of Figure 1.

Referring to the drawings, the upper leg section 1 and the lower leg section 2 are arranged with their ends abutting each other in the usual manner. A member 3, preferably tubular in construction, is permanently or otherwise secured to either the upper or lower leg section and projects beyond the end thereof. This member facilitates assembling, and when the structure is assembled, its projecting portion extends within the end of the abutting leg section and serves as a bracing means.

As is usual, in a derrick construction, a pair of horizontal girths 4 and 5 are arranged adjacent the abutting ends of the leg sections 1 and 2. The derrick fitting comprises a pair of members 6 and 7, one of which is secured to each of the horizontal girths respectively. The fittings are provided with sockets or recesses 8, in which the ends of the girths are adapted to be arranged, the ends of the girths being permanently secured in said sockets in any suitable manner. Each member of the fitting comprises substantially a semi-circular portion 9 adapted to embrace a portion of each of the leg sections. A bolt 10, may be passed through the fitting members 6 and 7, and the projecting portion of the bracing member 3, together with the leg section telescoping over the end thereof, to secure the fittings to the legs and the legs to each other thereby providing positive means of transmitting axial tension from the one leg section to the other. The bolt 10 is provided with a nut 11 arranged on its threaded end, and a pin 12 is adapted to be arranged in a pair of ears 13, formed on the fitting to prevent the nut from turning when in position. As shown, the pin is arranged vertically and is held in place by gravity. The other fitting member is provided with a pair of projections or lugs 13', adapted to prevent the bolt from turning when in position.

The socket 8 and the semi-circular portion 9 of the fitting are connected by a pair of spaced webs 14. Diagonal bracing members 15 are adapted to be arranged within the spaces between these webs, the webs being provided with registering openings, adapted to receive a pin 16, which passes through an opening 17, in the end of the bracing member. The pin is provided with an opening adapted to receive a locking pin 18.

By means of the construction shown, a simple and efficient fitting is provided by means of which a derrick may be readily assembled. There is only one bolt to be placed in position for each fitting and speedy assemblage is thus obtained.

The provision of a horizontal girth having fixed ends produces a much more rigid construction than in the usual type of derrick where the girths are merely received in sockets in the fitting. The construction is further advantageous, in that the two members forming a fitting are always in proper position and are not readily lost, as is the case where a relatively small member forming a part of the fitting is not permanently secured to one of the elements of the derrick.

It is to be understood that the form of our invention herewith shown and described is to be taken as a preferred example of the same, and that various changes in the number of bolts and pins, shape, size, and arrangement of parts may be resorted to without departing from the spirit of the invention or the scope of the subjoined claims.

Having thus described our invention, we claim:

1. The combination with a derrick having horizontal girths arranged substantially at right angles to each other, and legs formed in upper and lower sections having their abutting ends arranged near said girths, of a derrick fitting comprising a tubular member projecting into the adjacent ends of said leg sections, a pair of substantially semi-cylindrical members mounted on said girths and surrounding the adjacent ends of said leg sections, and a bolt passing through said semi-cylindrical members, said tubular member, and the upper leg section.

2. The combination with a derrick having horizontal girths arranged substantially at right angles to each other, and legs formed in upper and lower sections having their abutting ends arranged near said girths, of a derrick fitting comprising a tubular member projecting into the adjacent ends of said leg sections, an embracing means mounted on said girths and surrounding the adjacent ends of said leg sections, and a bolt passing through said embracing means, said tubular member, and the upper leg section.

In testimony whereof we affix our signatures in presence of two witnesses.

RICHARD RALPH BLOSS.
WILLIAM SCHWEMLEIN.

Witnesses:
HOWARD S. DITSCH,
HERBERT L. POSTLEWAIT.